(12) United States Patent
Huang et al.

(10) Patent No.: US 11,220,125 B2
(45) Date of Patent: Jan. 11, 2022

(54) PRINTED COMPOSITE

(71) Applicant: BESTWAY INFLATABLES & MATERIAL CORP., Shanghai (CN)

(72) Inventors: Shuiyong Huang, Shanghai (CN); Weiwei He, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 89 days.

(21) Appl. No.: 16/241,961

(22) Filed: Jan. 7, 2019

(65) Prior Publication Data
US 2019/0217644 A1 Jul. 18, 2019

(30) Foreign Application Priority Data
Jan. 16, 2018 (CN) .......................... 201820072281.5

(51) Int. Cl.
| | |
|---|---|
| B41M 1/10 | (2006.01) |
| B41M 1/30 | (2006.01) |
| B41M 7/00 | (2006.01) |
| B32B 27/30 | (2006.01) |
| B41M 1/12 | (2006.01) |

(52) U.S. Cl.
CPC .............. *B41M 1/10* (2013.01); *B41M 1/30* (2013.01); *B41M 7/0045* (2013.01); *B32B 27/304* (2013.01); *B32B 2255/26* (2013.01); *B32B 2307/714* (2013.01); *B32B 2451/00* (2013.01); *B41M 1/12* (2013.01); *B41M 2205/36* (2013.01); *B41M 2205/40* (2013.01); *B41M 2205/42* (2013.01); *Y10T 428/269* (2015.01)

(58) Field of Classification Search
CPC ........ B41M 1/10; B41M 1/30; B41M 7/0045; B41M 1/12; B41M 2205/36; B41M 2205/40; B41M 2205/42; B32B 27/304; B32B 2255/26; B32B 2307/714; B32B 2451/00
See application file for complete search history.

(56) References Cited

U.S. PATENT DOCUMENTS

| | | | | |
|---|---|---|---|---|
| 3,674,611 | A * | 7/1972 | Petry ....................... | B32B 3/263 428/319.7 |
| 7,338,986 | B2 * | 3/2008 | Ananthachar ......... | C08F 289/00 522/178 |
| 8,293,338 | B2 * | 10/2012 | Castelli ............... | B41J 11/0015 427/487 |
| 2002/0121631 | A1 * | 9/2002 | Rahman ............... | B41M 7/0045 252/500 |
| 2005/0107509 | A1 * | 5/2005 | Ananthachar ........ | C09D 177/00 524/457 |

(Continued)

OTHER PUBLICATIONS

Dow_ solvent_2017 (Year: 2017).*

*Primary Examiner* — Travis M Figg
(74) *Attorney, Agent, or Firm* — Dickinson Wright PLLC

(57) ABSTRACT

A printed composite including a substrate layer having an upper substrate surface for printing; an ink layer having an upper ink surface and an opposed lower ink surface, the lower ink surface being disposed on the upper substrate surface; and a protective layer covering the upper ink surface is disclosed. During use, the protective layer prevents the ink layer from being damaged, such as removal or discoloration, as could otherwise happen by exposure to sunscreen location. A method for preparing the printed composite is also provided.

11 Claims, 1 Drawing Sheet

(56) References Cited

U.S. PATENT DOCUMENTS

| | | | |
|---|---|---|---|
| 2005/0261391 A1* | 11/2005 | Narayan-Sarathy | ........................ C09D 151/003 522/173 |
| 2009/0255460 A1* | 10/2009 | Castelli | .............. B41J 11/00214 118/46 |
| 2010/0028586 A1* | 2/2010 | Enlow | ..................... B44C 1/105 428/41.3 |
| 2010/0166975 A1* | 7/2010 | Abergel | ................... C09D 4/00 427/511 |
| 2011/0070413 A1* | 3/2011 | Lausch | ................... B32B 33/00 428/201 |
| 2012/0115975 A1* | 5/2012 | Kania | .................. C08G 18/792 522/96 |
| 2013/0059120 A1* | 3/2013 | Shi | ........................... C08J 7/046 428/147 |
| 2014/0079948 A1* | 3/2014 | Ishida | ................... C09J 151/06 428/354 |

* cited by examiner

PRINTED COMPOSITE

CROSS REFERENCE TO RELATED APPLICATION

This U.S. utility patent application claims the benefit of Chinese patent application No. CN 201820072281.5 filed Jan. 16, 2018, the content of which is herein incorporated by reference in its entirety.

TECHNICAL FIELD

The invention relates to a printed composite, in particular, a printed composite with a protective layer.

BACKGROUND

Applying sunscreen prior to engaging in outdoor activities, especially in the summer, is a common practice around the world. In order to avoid sunburn, people routinely apply sunscreen to their bodies before exposing bare skin to the ultraviolet rays of the sun. Several products intended for outdoor use (e.g., sports equipment, swimming pools, toys, and leisure products) are often adorned with trademarks and decorative patterns that are printed as an ink layer on their surfaces. A problem exists wherein these products having a printed ink layer come into contact with sunscreen lotion, and the sunscreen lotion physically and/or chemically reacts with the printed ink layer, resulting in dissolution, removal, and/or discoloration of the printed ink. Thus, a solution is needed for printed composites that can withstand the physical and chemical harm caused by commonly used sunscreen lotions.

SUMMARY

Embodiments of the invention described herein provide for printed composites. The present invention improves upon existing composites by providing composites that contain a protective layer and are thus resistant to degradation.

It is also an object and advantage of the present invention to provide printed composites that are resistant to degradation resulting from contact with sunscreen agents.

A printed polyvinylchloride (PVC) composite is provided, which includes a PVC layer having an upper PVC surface. The printed polyvinylchloride (PVC) composite also includes an ink layer having an upper ink surface and an opposed lower ink surface, with the low ink surface being disposed on the upper PVC surface. A protective layer covers the upper ink surface of the ink layer and is configured to inhibit the ink layer from being altered from sunscreen, which is applied on for the protection of a user. The protective layer does not react with the ink layer.

In another aspect of the invention, a method for preparing the printed composite is provided. The method includes providing a PVC film comprising a substrate. The method also includes forming an ink layer on the PVC film and drying the ink layer. The method proceeds with forming the protective layer, which includes applying a transparent oil on the ink layer and curing the protective layer.

The printed composite of the invention can effectively prevent the ink layer from contacting the sunscreen lotion to avoid dissolution, removal, or discoloration of the ink layer.

BRIEF DESCRIPTION OF THE DRAWINGS

To understand the present disclosure, it will now be described by way of example, with reference to the accompanying drawings in which implementations of the disclosures are illustrated and, together with the descriptions below, serve to explain the principles of the disclosure.

DETAILED DESCRIPTION

This disclosure relates to printed composites comprising a substrate layer (e.g., a printed polyvinylchloride (PVC)), an ink layer, and a protective layer. Embodiments of the present invention include printed composites comprising a protective layer that covers an upper ink surface and prevents the ink surface from reacting physically or chemically with outside agents, such as sunscreen. The disclosure also relates to methods for preparing the printed composites described herein.

Figure 1:
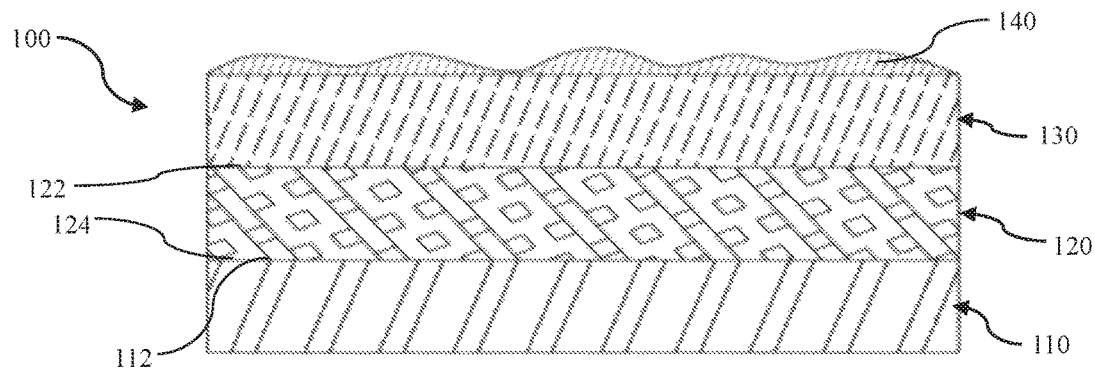
FIG. 1 is an embodiment of a printed composite according to the present invention, showing the sunscreen in contact with the protective layer.

Referring to FIG. 1, embodiments of the present invention relate to a printed composite 100 including a substrate layer 110, which may be, for example, a PVC film or layer. The substrate layer 110 has an upper substrate surface 112 for printing. The printed composite 100 also includes an ink layer 120 having an upper ink surface 122 and an opposed lower ink surface 124, the lower ink surface 124 being disposed on the upper substrate surface 112 of the substrate layer 110. The printed composite 100 also includes a protective layer 130 covering the upper ink surface 122 of the ink layer 120. The protective layer 130 may be inert and non-reacting with the ink layer 120 biologically, chemically, or otherwise. The protective layer 130 may have the same shape as the ink layer 120 or a similar shape to the ink layer 120. The protective layer 130 may be printed on the upper ink surface 122. The protective layer 130 may be the same size or larger than the ink layer 120, such that the protective layer 130 fully covers the ink layer 120 to prevent an external agent 140, such as sunscreen, from contacting and reacting with the ink layer 120. The protective layer 130 may be inert and not react with the ink layer 120 biologically, chemically, or otherwise.

In one embodiment, the protective layer 130 fully covers the substrate layer 110. In another embodiment, the protective layer 130 has the same shape as the ink layer 120 or similar shape to the ink layer 120.

The ink layer 120 may be printed on the substrate layer 110, for example, printed on an upper substrate surface 112 (e.g., an upper PVC surface). The ink layer 120 may also be referred to as the printed layer 120, and may be printed by electrostatic printing, electrographic printing, or any other desired printing technique.

The protective layer 130 may comprise polymers that may have strong adhesion to the ink layer 120, without reacting with the ink layer 120. For example, the protective layer 130 may be made of a transparent oil (e.g., air-drying transparent oil, UV transparent oil, or any other desired transparent oil). The protective layer 130 may be made of air-drying transparent oil, which may include solid components and solvent components that can dissolve the solid components. The protective layer 130 may not react with the ink layer 120 or with an external agent (e.g., sunscreen lotion, sunscreen spray, sunscreen solid stick or sunscreen in any other form).

The solid components may be polyacrylate, chloroacetate resin, polyurethane, or a combination thereof. Polyacrylate, chloroacetate resin and polyurethane in the solid components have strong adhesion to PVC resin in the ink layer such that the protective layer can adhere to the ink layer 120. In some embodiments, the solid components may comprise two or more solid components. For example, the solid components of the protective layer may comprise 5%-15% (by weight) polyacrylate, 8%-13% (by weight) chloroacetate resin, and 10-20% (by weight) polyurethane.

The solvent components may be propylene glycol monomethyl ether propionate, ethyl 3-ethoxypropionate, propylene glycol monomethyl ether acetate, or a combination thereof. In some embodiments, the solvent components may comprise two or more solvents. For example, the solvent components of the protective layer may comprise 10%-30% (by weight) propylene glycol monomethyl ether propionate, 10%-30% (by weight) ethyl 3-ethoxypropionate and 15%-30% (by weight) propylene glycol monomethyl ether acetate.

The protective layer 130 may be made of any UV transparent oil, which may be prepared with a polymer, a photosensitive monomer, and a photoinitiator. The polymer may be a UV oligomer that may comprise modified acrylate oligomer or polyurethane oligomer. The UV oligomer will react with the photosensitive monomer under the initiation of the photoinitiator to form the UV transparent oil, which forms the protective layer 130 on the upper ink surface 122 that will have strong adhesion to the ink layer 120.

In some embodiments, the UV transparent oil may be prepared with 20%-80% UV oligomer, 18-70% photosensitive monomer, and 1%-10% photoinitiator.

The protective layer 130 may have a thickness of about 0.005, 0.007, 0.01, 0.02, or 0.03 mm. The protective layer 130 may have a thickness ranging from 0.005 mm to 0.02 mm or any other desired range of thickness. In an exemplary embodiment, the protective layer 130 has a thickness of 0.01 mm.

The ink layer 120 may be made of PVC resin. The thickness of the ink layer 120 may range from about 0.01 mm to about 0.04 mm, about 0.02 mm to about 0.04 mm, about 0.02 mm to about 0.03 mm, or any other desired range of thickness. The thickness of the ink layer 120 may be 0.01, 0.02, 0.03, 0.04, 0.05 mm, or any other desired thickness.

In some embodiments of the present invention, the protective layer 130 may be printed on the upper ink surface 122. In some embodiments of the present invention, the protective layer 130 may adhere to the ink layer 120 and resist alteration of the ink layer 120 from an external agent (e.g., sunscreen lotion, sunscreen spray, sunscreen solid stick or sunscreen in any other form).

The printed composites 100 described herein can be used in several different products. For example, products intended for outdoor use (e.g., sports equipment, swimming pools, toys, leisure products, or any other desired product) that have trademarks and/or decorative patterns printed on their surfaces to form an ink layer 120 can benefit from the printed composites disclosed herein. In some embodiments, an inflatable swimming pool may include the disclosed printed composite 100. In some embodiments, a swimming pool liner may include the disclosed printed composite 100.

Methods for Preparing Printed Composites with a Protective Layer

The printed composites 100 described herein can be prepared using any suitable method. In some embodiments, a method for preparing the printed composite 100 may comprise the following: (1) forming an ink layer 120 on the substrate 110 (e.g., PVC film) by means of screen printing, wherein one screen is used for printing each ink color, and drying may be performed following each printing; and (2) forming a protective layer 130 on the ink layer 120 with an additional screen. The drying may be performed, for example, by air-drying for 10 to 20 seconds, or drying for 5 to 10 seconds at low temperature (30 to 50° C.) or by any other desired technique. The protective layer 100 may be made of any transparent oil. In some embodiments, the screen printing may be performed automatically.

The transparent oil for the protective layer 130 may comprise a UV transparent oil, and a UV drying device may be provided to produce UV light. The UV light may have a wavelength from 300 to 420 nm, from 320 to 410 nm, from 350 to 400 nm, from 375 to 490 nm, or any other desired wavelength range. The UV light may have a wavelength of 300, 320, 340, 360, 380, 400, 420 nm, or any other desired wavelength. The UV light may be produced for about 10 seconds to about 5 minutes, about 30 seconds to about 4 minutes, about 45 seconds to about 3 minutes, about 60 seconds to about 2 minutes, or any other desired range of times. The UV drying device may comprise an LED lamp, an electrodeless lamp, an iron ion lamp, a halogen lamp, or any other UV drying device.

Figure 2:
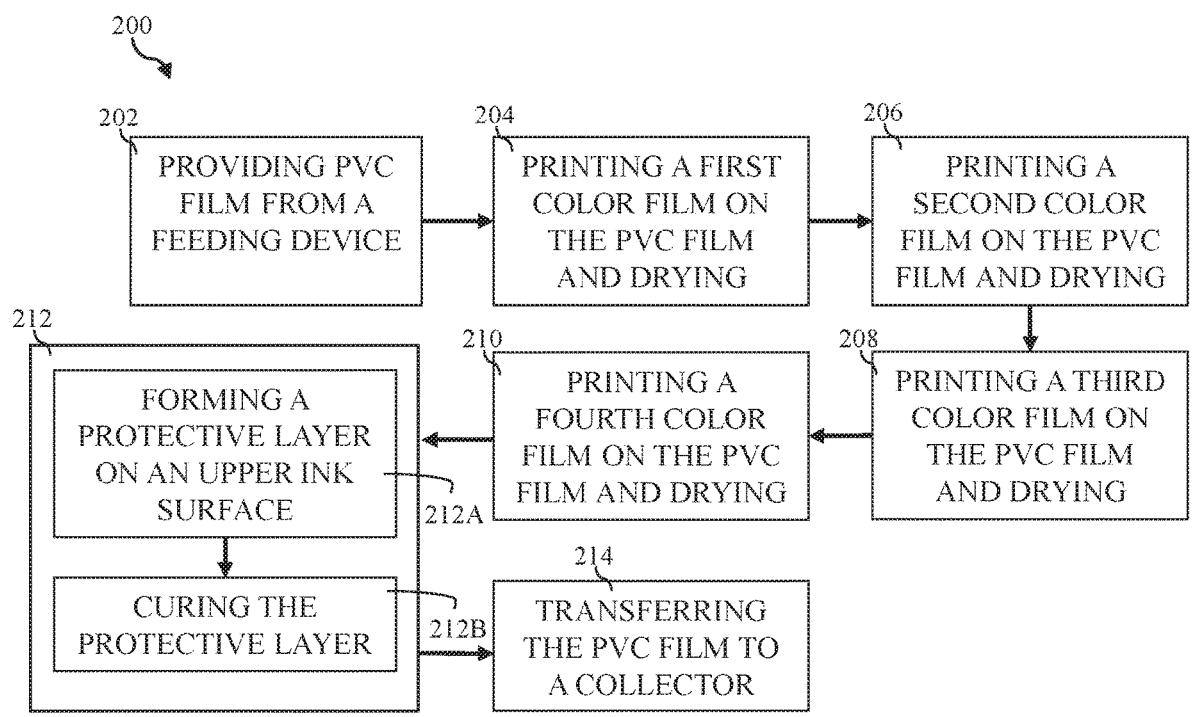
FIG. 2 is a schematic showing a process for making embodiments of the printed composites described herein.

Referring to FIG. 2, a method 200 for preparing the printed composite 100 is provided. The method 200 includes providing a PVC film as a substrate 110 at step 202. The method 200 also includes forming an ink layer 120 on the PVC film, for example by screen printing, wherein one screen may be used for printing each color film, and drying may be performed following each printing. Specifically, the printing process may include printing a first color film on the PVC film and drying the first color film at step 204. The printing process may also include printing a second color film and drying the second color film at step 206. The printing process may also include printing a third color film and drying the third color film at step 208. The printing process may also include printing a fourth color film and drying the fourth color film at step 210. Any desired number of printing and drying cycles may be employed. The color films may be dried, for example, by air-drying for 10 to 20 seconds, or drying for 5 to 10 seconds at low temperature (30 to 50° C.), by a UV drying device, or any other desired drying technique.

The method 200 proceeds with forming the protective layer 130 at step 212, which may include applying a transparent oil, such as a UV transparent oil, on the ink layer at step 212A and curing the protective layer 130 at step 212B. The step of curing the protective layer 130 may include using air, which may be heated, to dry the transparent oil, although any other desired curing technique may be employed. The step of curing the protective layer 130 may be accomplished by exposing the UV transparent oil to ultraviolet (UV) or another type of light such as visible or infrared (IR) light. In an exemplary embodiment, the UV transparent oil may include a UV oligomer, a photosensitive monomer, and a photoinitiator. Exposure to the light initiates the photoinitiator, which causes the UV oligomer to react with the photosensitive monomer, which forms the protective layer 130 on the upper ink surface 112 to have strong adhesion to the ink layer 120.

The method 200 may also include transferring the printed composite 100 including the substrate layer 110, the ink layer 120, and the protective layer 130, to a collector at step 214. The collector may be a receiving device, such as a package or other container, configured to receive the printed composite 100 and to help maintain and use the printed composite 100.

In some embodiments, the transparent oil for the protective layer 130 may be air-drying transparent oil, and the drying may be performed by air-drying for 10 to 20 seconds or drying at low temperature (30 to 50° C.) for 5 to 10 seconds.

In other embodiments of the present invention, a method for preparing the printed composite 100 may comprise the following: (1) forming an ink layer 120 on the substrate 110 (e.g., PVC film) by means of intaglio printing, wherein one roller is used for printing each ink color, and drying is performed following each printing; and (2) forming a protective layer 130 on the ink layer 120 with an additional screen. The drying may be performed by air-drying for 10 to 20 seconds or drying for 5 to 10 seconds at low temperature (30 to 50° C.) or any other desired drying technique and timeframe. The protective layer 130 may be made of any transparent oil.

The transparent oil for the protective layer 130 may be a UV transparent oil, and a UV drying device may be provided to produce UV light. The UV light may have a wavelength from 300 to 420 nm, from 320 to 410 nm, from 350 to 400 nm, from 375 to 490 nm, or any other desired wavelength range. The UV light may have a wavelength of 300, 320, 340, 360, 380, 400, 420 nm, or any other desired wavelength. The UV light may be produced for about 10 seconds to about 5 minutes, about 30 seconds to about 4 minutes, about 45 seconds to about 3 minutes, about 60 seconds to about 2 minutes, or any other desired time range. The UV drying device may comprise an LED lamp, an electrodeless lamp, an iron ion lamp, a halogen lamp, or any other desired UV drying device.

In some embodiments of the present invention, the transparent oil for the printing protective layer 130 may comprise an air-drying transparent oil, and the drying may be performed by air-drying for 10 to 20 seconds or drying at low temperature (30 to 50° C.) for 5 to 10 seconds or any other desired drying technique and timeframe.

Ingredients of Conventional Sunscreen Lotion

Commonly used sunscreens, whether in lotion, spray, solid stick or other forms, comprise a physical sunscreen agent, a chemical sunscreen agent, an anti-oxidant and a moisturizer. The physical sunscreen agent may comprise zinc oxide, titanium dioxide, and the like. The chemical sunscreen agent may be 2-ethylhexyl-4-methoxycinnamate with a boiling point of 130° C., bis-ethylhexyloxyphenol methoxyphenyl triazine (which may be in the form of a light yellow powder), di-ethylaminohydroxybenzoyl hexyl benzoate (which may be in the form of a white powder), and ethylhexyl triazone with boiling point of 214° C. The anti-oxidant may be ascorbyl tetra-2-hexyldecanoate (which may be in the form of a colorless crystal) and tocopheryl acetate (which may be in the form of a viscous liquid). The moisturizer may be hyaluronic acid (which may be in the form of a white solid). In addition, sunscreen lotions may also include glycerin and liquid paraffin.

The solid components mentioned above are easily dissolved in solvents such as alcohols, esters, and ketones, and the like, to form solutions with a high boiling point. Glycerin, liquid paraffin and ethylhexyl triazone, and the like are nonvolatile. All of bis-ethylhexyloxyphenol methoxyphenyl triazine, diethylaminohydroxybenzoyl hexyl benzoate and ascorbyl tetra-2-hexyldecanoate in sunscreen lotion (in any sunscreen form) are likely to react with the PVC resin present in the ink layer 120 of the printed composites 100 described above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

EXEMPLIFICATION

Experiments were performed to demonstrate that the protective layer 130 of the present invention, which may be made of transparent oil with different formulations as set forth below by way of example, can have strong adhesion to the ink layer 120 and resistance to sunscreen lotion (in any sunscreen form).

Protective layers 130 were prepared and evaluated using transparent oils with several different formulations. The prepared transparent oils were printed on a well-prepared PVC film to form a protective layer 130, and the protective layer's adhesion to the ink layer 120 and the resistance to degradation from sunscreen lotion (in any sunscreen form) were evaluated.

Evaluation on Adhesion to the Ink Layer

A colorless and transparent 3M 600SCOTCH standard adhesive tape with a thickness of 0.33 mm±0.01 mm and an area of 15 cm×20 cm was provided. Standard adhesive tape was firmly pressed on the protective layer 130 by thumb and then quickly pulled upward at an angle of 90° to evaluate the extent, if any, of ink removal from the ink layer 120. If the results show that no removal of the ink is observed, the adhesion to the ink layer 120 is assessed as good.

Evaluation on Resistance to Sunscreen Lotion

Under the standard of ISO 105-X12:2001, the protective layer 130 on a PVC film was rubbed repeatedly 200 times with a white friction cloth on a color fastness friction tester. Then, the white friction cloth was compared with a colorimetric card. If the result shows that there is no color on the friction cloth, the resistance to sunscreen lotion (in any sunscreen form) is assessed as good.

Sunscreen Lotions for Experiments

The sunscreen lotions employed for various experiments include Mentholatum with SPF50+, PA+++ and L'oreal with SPF50+, PA+++. The sunscreen lotions comprised water, ethanol, ethylhexyl-methoxycinnamate, di-ethylaminohydroxybenzoyl hexyl benzoate, phenylbenzimidazole sulfonic acid, cyclopentapolydimethylsiloxane, butylene glycol dicaprylic acid, ethylhexyl triazone, sodium citrate, propylene glycol, disodium phenyl dibenzimidazole tetrasulfonate, bis-ethylhexylphenol methylaminophenyl triazine, ascorbate, and the like.

Formulations for Air-Drying Transparent Oil

The air-drying transparent oil comprised solvent components, resin components (i.e. solid components) and auxiliaries.

The solvent components comprised 10%-30% (by weight) propylene glycol monomethyl ether propionate, 10%-30% (by weight) ethyl 3-ethoxypropionate, and 15%-30% (by weight) propylene glycol monomethyl ether acetate. The resin components comprised 5%-15% (by weight) polyacrylate, 8%-13% (by weight) chloroacetate resin, and 10%-20% (by weight) PU resin. The auxiliaries comprised 1% (by weight) defoaming agent and 1% (by weight) leveling agent.

The solvent components comprised three organic solvents with different boiling points and different solubility. The ratios among respective components depend on capability for dissolving the resin components, volatilizing rate, and printability. Furthermore, the solvent components should not influence the protective layer's adhesion to the ink layer or resistance to sunscreen lotion.

The selection of auxiliaries depends on printability, and the auxiliaries should not influence the protective layer's adhesion to the ink layer and resistance to sunscreen lotion.

The data presented in Table 1 demonstrates that the transparent oils with five different formulations (given in percentages by weight) did not influence the protective layer's adhesion to the ink layer and resistance to sunscreen lotion (see Table 2).

TABLE 1

|  | Formulation 1 | Formulation 2 | Formulation 3 | Formulation 4 | Formulation 5 |
|---|---|---|---|---|---|
| propylene glycol monomethyl ether propionate | 20% | 20% | 20% | 20% | 20% |
| ethyl 3-ethoxypropionate | 20% | 20% | 20% | 20% | 20% |
| propylene glycol monomethyl ether acetate | 20% | 20% | 20% | 20% | 20% |
| polyacrylate | 5% | 10% | 15% | 15% | 0 |
| chloroacetate resin | 13% | 8% | 13% | 0 | 14% |
| PU resin | 20% | 20% | 10% | 20% | 20% |
| defoaming agent | 1% | 1% | 1% | 1% | 1% |
| leveling agent | 1% | 1% | 1% | 1% | 1% |

TABLE 2

|  | Adhesion to ink layer | Resistance to sunscreen lotion |
|---|---|---|
| Formulation 1 | GOOD | GOOD |
| Formulation 2 | GOOD | GOOD |
| Formulation 3 | GOOD | GOOD |
| Formulation 4 | GOOD | GOOD |
| Formulation 5 | GOOD | GOOD |

Preparation of Formulations for UV Transparent Oil

UV transparent oils comprising the following ingredients were prepared: 20%-80% (by weight) UV oligomer, 18%-70% (by weight) photosensitive monomer, 1%-10% (by weight) photoinitiator, 0.5% (by weight) polymerization inhibitor, and 0.5% (by weight) base material wetting agent.

The photosensitive monomer is an acrylate-based active monomer with unsaturated mono-functionality group or multi-functionality groups at the end of a molecule, for adjusting varicosity of the transparent oil and improving adaptability.

The data presented in Table 3 demonstrates that the UV transparent oils with four different formulations (given in percentages by weight) did not influence the protective layer's adhesion to the ink layer and resistance to sunscreen lotion (see Table 4).

TABLE 3

|  | Formulation 1 | Formulation 2 | Formulation 3 | Formulation 4 |
|---|---|---|---|---|
| UV oligomer | 20% | 80% | 50% | 50% |
| photosensitive monomer | 70% | 18% | 45% | 39% |
| photoinitiator | 5% | 1% | 1% | 10% |
| polymerization inhibitor | 0.5% | 0.5% | 0.5% | 0.5% |
| base material wetting agent | 0.5% | 0.5% | 0.5% | 0.5% |

TABLE 4

|  | Adhesion to ink layer | Resistance to sunscreen lotion |
|---|---|---|
| Formulation 1 | GOOD | GOOD |
| Formulation 2 | GOOD | GOOD |
| Formulation 3 | GOOD | GOOD |
| Formulation 4 | GOOD | GOOD |

Conclusions:

The exemplary protective layers 130 made of the transparent oils with the above formulations has good adhesion to ink layer 120 and resistance to sunscreen lotion (in any sunscreen form). Various other transparent oils and formulations may be employed, consistent with embodiments of the present invention, to achieve similar successful results.

What is claimed is:

1. A printed polyvinylchloride (PVC) composite comprising:
    a PVC layer having an upper PVC surface;
    an ink layer having an upper ink surface and a lower ink surface, opposite the upper ink surface, the lower ink surface being disposed on the upper PVC surface; and
    a protective layer comprising a solid component dissolved in a solvent component, the protective layer disposed on the upper ink surface of the ink layer, wherein the protective layer does not react with the ink layer and is configured to inhibit alteration of the ink layer from sunscreen for application on and protection of a user;
    wherein the solid component comprises at least one of: 8%-13% (by weight of the protective layer) chloroacetate resin and 10%-20% (by weight of the protective layer) polyurethane.

2. The composite of claim 1, wherein the solvent component comprises at least one of: propylene glycol monomethyl ether propionate, ethyl 3-ethoxypropionate, and propylene glycol monomethyl ether acetate.

3. The composite of claim 1, wherein the solvent component comprises at least one of: 10%-30% (by weight) propylene glycol monomethyl ether propionate, 10%-30% (by weight) ethyl 3-ethoxypropionate, and 15%-30% (by weight) propylene glycol monomethyl ether acetate.

4. The composite of claim 1, wherein the protective layer comprises an air-drying transparent oil including the solvent component and the solid component, the solid component including a resin component.

5. The composite of claim 4, wherein the solvent component of the protective layer comprises at least one of: propylene glycol monomethyl ether propionate, ethyl 3-ethoxypropionate, and propylene glycol monomethyl ether acetate.

6. The composite of claim 4, wherein the solvent component of the protective layer comprises at least one of: 10%-30% (by weight) propylene glycol monomethyl ether propionate, 10%-30% (by weight) ethyl 3-ethoxypropionate, and 15%-30% (by weight) propylene glycol monomethyl ether acetate.

7. The composite of claim 4, wherein the air-drying transparent oil further comprises auxiliaries including a defoaming agent and a leveling agent.

8. The composite of claim 1, wherein the protective layer has a thickness of 0.005 mm to 0.02 mm.

9. A printed polyvinylchloride (PVC) composite comprising:
    a PVC layer having an upper PVC surface;

an ink layer having an upper ink surface and a lower ink surface, opposite the upper ink surface, the lower ink surface being disposed on the upper PVC surface;

a protective layer disposed on the upper ink surface of the ink layer, wherein the protective layer does not react with the ink layer and is configured to inhibit alteration of the ink layer from sunscreen for application on and protection of a user;

wherein the protective layer comprises an ultraviolet (UV) transparent oil including a polymer, a photosensitive monomer, and a photoinitiator, and wherein the polymer of the ultraviolet (UV) transparent oil includes a polyurethane oligomer.

10. The composite of claim 9, wherein the polymer comprises a UV oligomer, the UV oligomer includes the polyurethane oligomer, the UV transparent oil contains 20%-80% (by weight) UV oligomer, 18%-70% (by weight) photosensitive monomer, and 1%-10% photoinitiator.

11. The composite of claim 9, wherein the polymer further comprises modified acrylate oligomer.

\* \* \* \* \*